April 26, 1960     C. P. STRAND     2,934,326
SHOWER DECK CONTACTING COLUMN
Filed Jan. 7, 1954

INVENTOR:
CARL P. STRAND
BY: *Oswald H. Milmore*
HIS ATTORNEY

United States Patent Office 2,934,326
Patented Apr. 26, 1960

2,934,326

SHOWER DECK CONTACTING COLUMN

Carl P. Strand, El Cerrito, Calif., assignor to Shell Oil Company, a corporation of Delaware Application January 7, 1954, Serial No. 402,616

4 Claims. (Cl. 261—113)

The present invention relates to columns for effecting contact between an ascending gas and a descending liquid of the type commonly known as shower decks, i.e., wherein the liquid flows between trays as showers and the gas moves with a horizontal velocity component through the showers. Such columns, illustrated in U.S. Patents Nos. 1,945,600, 1,987,097 and 2,357,670, are suitable, for example, for fractional distillation, and are characterized by low pressure drop. The term gas, as used herein, includes vapor.

Shower deck fractionating columns currently in use have poor contacting efficiencies, and the ratio of actual contact stages or trays to theoretical contact stages is large; also, the permissible gas flow rates are limited by the tendency of the gas to carry entrained liquid up to a higher stage. These conditions make it necessary to employ large and costly equipment. It is an object of the invention to improve such columns by increasing the stage efficiency and the capacity; by this it becomes possible to employ a fewer number of trays, leading to reduced capital cost and further reducing the pressure drop and/or permitting the gas to flow through the column at larger rates for the same or lower pressure drop.

In summary, according to the invention, the vertically spaced tray decks are arranged to extend over a part of the column cross sectional area, leaving a vapor passage around each deck, and parts of adjoining decks are disposed in overlapping relation, each deck having perforations at a restricted area of the overlapping portion situated remote from the said vapor passage through the respective deck, the portion of the deck between the said restricted perforated area and the said vapor passage being imperforate. The gas passing horizontally through a shower of liquid descending from each higher deck must, therefore, flow beyond the shower and beneath the imperforate portion of said higher deck before ascending through the next vapor passage. Improved stage contacting efficiencies and capacity are thereby achieved.

The invention will be further described with reference to the accompanying drawings forming a part of this specification and illustrating two preferred embodiments thereof, wherein.

Figure 3:
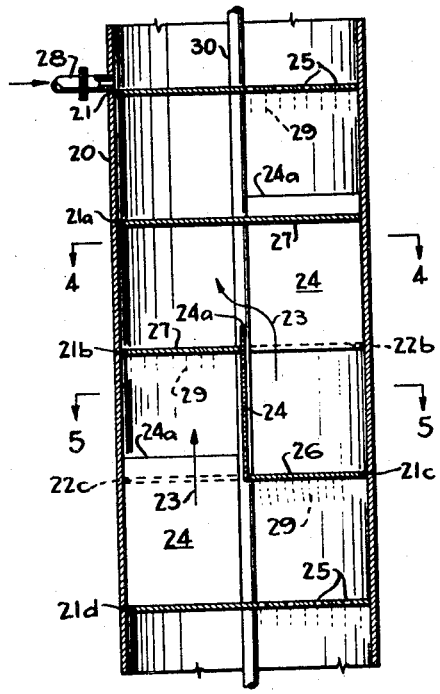
Figure 4:
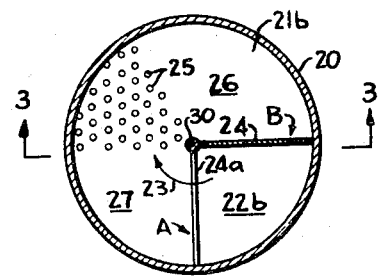
Figure 5:
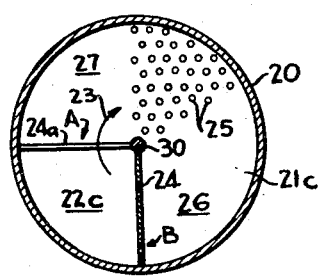

Figure 3 is a vertical sectional view of a portion of a shower deck contacting column according to a modified construction, taken on the line 3—3 of Figure 4; and Figures 4 and 5 are sectional views taken on the lines 4—4 and 5—5, respectively, of Figure 3.

The embodiment shown in Figures 1 and 2 comprises a column 10 in which are mounted a series of overlapping tray decks 11, 11a, etc., disposed to provide vapor riser passages 12, 12a, etc., of ample widths as described hereinafter. The trays are all of like construction but alternate trays are reversed, so that the vapor risers are in staggered disposition; hence vapor must flow horizontally between each pair of adjacent decks when passing from one vapor riser to the next, as indicated by the arrow 13. The edge of each tray is raised at the vapor riser, e.g., by providing a dam 14. Each tray deck has a plurality of small openings 15, e.g., circular perforations as shown, in a restricted area of an overlapping part of the deck that is situated remote from the vapor riser passage that traverses the respective deck, leaving an imperforate area 16 between the perforate area and the said vapor passage. The width of this imperforate area 16, reckoned in the direction of vapor flow, is at least one-third and, preferably, about 0.5 to 0.8 of the total extent of the overlap, and the perforate area may occupy the remainder of the overlap. Each tray deck further has an imperforate area 17 extending above the riser passage of the next lower deck. Reflux liquid is fed to the unperforated portion 17 of the upper deck through a pipe 18 from any suitable source, such as a condenser (not shown); such a pipe may, however, be used to charge feed stock and may be applied to any tray deck in the column, in the manner of and for the purposes indicated in the said aforesaid U.S. Patent No. 1,945,600. The liquid issues through the openings 15 as a fine rain or shower 19 across the path of the vapors, which deflect the shower from the vertical, as shown. The liquid is caught on the next lower deck, being retained thereon by the end dam 14, and flows horizontally on the imperforate portions of the deck to the openings 15 thereof. The column is, of course, further provided with the usual means for causing gas or vapor to ascend, e.g., a reboiler in the case of a fractional distillation column; such appurtenances, being well known per se, are not shown.

Upon flowing through the showers 19 the vapor comes into contact with the liquid drops, as in the conventional shower decks. However, after emerging from the shower the vapor continues to flow essentially horizontally between decks, affording entrained liquid an opportunity to fall out onto the deck below, a part of the fall-out striking the deck at the perforations 15, and another part at the imperforate part 17 thereof. This greatly reduces the tendency of the vapor to carry liquid up to the higher tray and thereby increases the contacting efficiency. Moreover, it permits greater vapor velocities to be used with a given degree of entrainment than in the prior arrangements. The width of the vapor riser passageways 12, 12a, etc., should be ample, as was indicated above, so as to avoid unduly high upward vapor velocities that, apart from promoting higher pressure drops, tend to carry entrained liquid upward. In the preferred embodiment these riser passageways and, hence, the imperforate portions 17 extend over about one-sixth to one-fourth of the total column area; in the case of a circular column shown, the width of this segment-shaped portion is about one-third of the total width of the column.

The invention may also be applied to other constructional arrangements, e.g., wherein the gas flows in a generally arcuate path between trays for less than a complete circle, the expression "generally arcuate" being used to include polygonal paths; the overall movement through the column may then be described as helix-like. Such an embodiment is shown in Figures 3–5, wherein the column 20 contains a central post 30 and a plurality of tray decks 21, 21a, etc., each deck being shaped as a sector of about 270° of arc (extending from a radial edge A to a radial edge B) and having an open sector constituting a vapor riser passageway; only the passages 22b and 22c appear in the drawings. The trays are all of like construction but installed at progressively different orientations; as is evident from Figures 4 and 5, each tray is disposed counter-clockwise from the tray beneath it by an angle equal to the angle of the vapor riser gap, i.e., 90° in the embodiment shown, whereby adjacent decks overlap through 180° of arc. Vapor must, therefore, flow between adjacent decks arcuately through an angle of 180° about the central axis of the column from one riser to the next, as indicated by the arrows 23. The radial edge A of each tray at the counter-clockwise extremity abuts a vertical radial wall 24 that rises slightly above the deck to form an end dam 24a; this wall also extends downwards to the next lower deck with which it is in sealing relation along the edge B thereof, at the clockwise extremity of the deck. The radially inner and outer margins of these walls are sealed to the central post 30 and the column wall, respectively. These radial walls in part bound the vapor riser passages. While horizontal decks with dams are shown, it is evident that this construction is not in every case essential, the only requirement being that the radial edge A at the counter-clockwise extremity be higher than the adjoining part of the tray deck so as to retain liquid. Each deck has a sector extending through about 50° to 120° of arc, preferably less than 90°, containing openings 25, this perforated sector being situated remote from the said radial edge B around which the vapors flow to ascend from beneath to above the respective deck. An imperforate sector 26 is situated between the end edge B and the perforations 25; it extends over at least 60° of arc and, preferably, over about 90° to 145° of arc (respectively, one-third and between about 0.5 and 0.80 of the overlap). A further imperforate sector 27 extends above the vapor riser passage of the next lower tray, being situated between the edge A and the perforations 25 and extending over a sector equal to the size of the gap, i.e., 90° in the case illustrated. Reflux liquid is fed to the unperforated portion 27 of the upper deck and/or other decks through a pipe 28 from any suitable source, such as a condenser (not shown). The liquid issues through the openings 25 as a fine rain or shower 29 across the path of the vapors, which deflect the shower from the vertical. The liquid is caught on the next lower deck, being retained thereon by the end dam 24, and flows horizontally on the imperforate portions of the deck to the openings 15 thereof.

The operation of the device according to Figures 3–5 and the advantages are similar to those previously described; this embodiment, however, affords a more efficient utilization of space. Thus, vapor, after ascending through a vapor riser passage adjacent a radial wall 24 toward the under side of the imperforate sector 27 of any given plate, travels horizontally in a clockwise direction beneath said plate and passes through a shower 29 descending from the perforations 25 immediately upon passing the edge A of the next lower tray. After emerging from the shower the vapors flow under the imperforate sector 26 for a prolonged path, e.g., through 120° of arc in the case illustrated, before reaching the next vapor riser passage just beyond the edge B; this affords time for entrained liquid to drop out. By making the gaps in the tray of ample size, e.g., about 90° as shown, the riser passages have sufficient size to avoid excessive vertical vapor velocities.

*Example*

Figure 1:
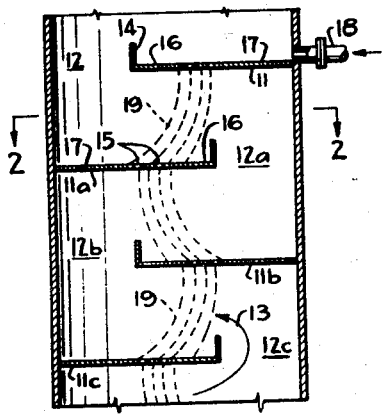
Figure 1 is a vertical sectional view of a portion of a shower deck contacting column according to the invention, taken on the line 1—1 of Figure 2.
Figure 2:
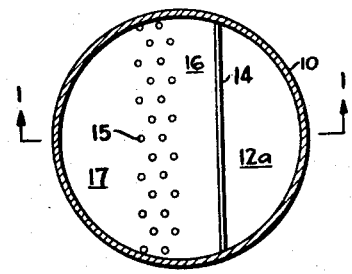
Figure 2 is a sectional view taken on the line 2—2 of Figure 1.

The following experimental work gives an indication of the degree of improvement attained by the construction according to the invention, in comparison to prior art constructions:

A test column rectangular in horizontal cross section was used having horizontal trays spaced apart vertically 24 in., and constructed as shown in Figures 1 and 2, the overlapping portions being square, three feet on the side, and the vapor riser passages being segmental in shape and providing 1.66 sq. ft. of area. The perforations extended over a strip eight inches in width.

Water containing a low concentration of a volatile solute was passed down the column and air was passed up in two runs at different air flow rates. For purposes of comparison, a third run was made in the same column modified only by replacing the trays with others wherein the perforated strip was located immediately adjoining the end dam 14, in accordance with prior practice. The tray efficiencies and tray pressure loss were determined for each run. Operating conditions and results are shown in the following table:

|  | Construction According to the Invention | | Prior Construction |
|---|---|---|---|
| Air Flow, cu. ft./min. | 3,500 | 4,000 | 3,500 |
| Water Flow, Gallons/min. | 25 | 25 | 25 |
| Tray Pressure Loss, in. $H_2O$ | 0.72 | 0.95 | 1.01 |
| Tray Efficiency, Percent [1] | 24.9 | 33.9 | 12.2 |
| Theoretical Trays/In. $H_2O$ Tray Pressure Loss | 0.346 | 0.357 | 0.121 |

[1] Determined from the stripping of volatile solute from water with air

The lower tray pressure drop and the improved tray contacting efficiency attained by the invention are evident.

I claim as my invention:

1. A shower deck contacting apparatus comprising a column, a plurality of vertically spaced trays in the column, each tray extending partially across the column and providing a large opening forming a gas riser passage, said trays being disposed so that portions of adjacent trays overlap and the said large openings in adjacent trays are in horizontally staggered relation, whereby said openings in adjacent trays are separated by overlapping portions of the trays for the flow of gas essentially horizontally between overlapping portions of adjacent trays, each tray having a plurality of small liquid downflow openings for the downward passage of liquid situated in the overlapping portion thereof and an imperforate area also in said overlapping portion between said liquid downflow openings and the opening of the tray through which gas rises past the respective tray, said imperforate area having a width, measured in the direction of gas flow, of at least one-third of the extent of said overlap and many times the intervals between adjacent openings, said imperforate area and the part of the tray having said openings being in free communication at the tray level for the flow of liquid.

2. A shower deck contacting apparatus comprising a column, a plurality of vertically spaced trays in the column, each tray extending partially across the column and providing a large opening forming a gas riser passage, said trays being disposed so that portions of adjacent trays overlap and that said openings in adjacent trays are separated by overlapping portions of the trays for the flow of gas essentially horizontally between overlapping portions of adjacent trays, each tray having a dam extending above the tray to a height less than the intertray space adjoining the gas riser passage through which gas rises past the respective tray, a first imperforate portion situated in the over-lapping part and adjoining said dam, said first imperforate portion having a width between 0.5 and 0.8 of the extent of said overlap, measured in the direction of gas flow, a plurality of small openings for the downward passage of liquid spaced at intervals which are submultiples of the width of said first imperforate area and confined within a restricted area situated in the overlapping portion adjoining the said first imperforate portion and in free communication therewith at the tray level for the flow of liquid therebetween, and a second imperforate portion beyond said restricted area and extending over the gas riser passage through the next lower tray.

3. Apparatus according to claim 2 wherein said trays have the said second imperforate portions thereof contiguous to the column wall, alternate trays being reversed, whereby gas moved alternately toward opposite sides of the column is flowing successively through the spaces between overlapping portions of adjoining trays.

4. Apparatus according to claim 2 wherein said trays are peripherally contiguous to the column wall and have openings arranged sectorially, adjoining trays being differently oriented so that the said second imperforate portion of each tray is above the opening in the adjacent lower tray, and an upright wall for each tray, each upright wall extending downwardly from the dam at the opening of the respective tray to the next lower tray.

References Cited in the file of this patent

UNITED STATES PATENTS

| | | |
|---|---|---|
| 1,987,097 | Coubrough | Jan. 8, 1935 |
| 2,286,329 | Bannon | June 16, 1942 |
| 2,310,829 | Becker | Feb. 9, 1943 |